United States Patent

[11] 3,569,861

[72] Inventors James W. Tucker
Alexandria;
James N. Bradford, Falls Church, Va.
[21] Appl. No. 840,561
[22] Filed Mar. 14, 1969
Division of Ser. No. 442,838, Mar. 25, 1965, Patent No. 3,449,615.
[45] Patented Mar. 9, 1971
[73] Assignee The United States of America as represented by the Secretary of the Navy

[54] XENON FLASH LAMP FOR LASER PUMPING IN LIQUID NITROGEN
4 Claims, 2 Drawing Figs.
[52] U.S. Cl. .................................................. 331/94.5
[51] Int. Cl. ........................................... H01s 3/04

[50] Field of Search ................................. 331/94.5

[56] References Cited
UNITED STATES PATENTS
3,356,966 12/1967 Miller ........................... 331/94.5
3,449,615 6/1969 Tucker et al. ................. 331/94.5X Primary Examiner—Ronald L. Wibert
Assistant Examiner—R. J. Webster
Attorneys—R. S. Sciascia, A. L. Branning and M. L. Crane ABSTRACT: This disclosure is directed to a laser system including therein a flashlamp which is operable at a temperature of about −180° C. and lower. The laser lamp may be immersed in the coolant fluid and optically coupled to the laser element which may be contained within the coolant.

Patented March 9, 1971

3,569,861

INVENTORS
JAMES N. BRADFORD
JAMES W. TUCKER

BY *Melvin L. Crane* AGENT

*R H ...* ATTORNEY

XENON FLASH LAMP FOR LASER PUMPING IN LIQUID NITROGEN

This is a division of application serial No. 442,838 filed Mar. 25, 1965, now Patent No. 3,449,615

STATEMENT OF GOVERNMENT INTEREST

The invention described herein may be manufactured and used by or for the Government of the United States of America for governmental purposes without the payment of any royalties thereon or therefor The present invention is directed to a flashlamp such as used in laser systems and more particularly to a flashlamp useable in a laser system operable at a temperature which is lower than the temperature at which the gaseous filling within the lamp freezes or at which the partial pressure of the gaseous filling is too low to permit the establishment of an electrical discharge.

Heretofore suitable flashlamps have been provided for laser systems which are operable at room temperature. Many experiments in laser physics and laser system application require that the laser material be cooled to a temperature of negative 180° C. or lower. In a typical system the cooling is accomplished by immersing the laser rod in liquid nitrogen contained in a fused silica Dewar flask. The Dewar flask is placed within the coil of a helical flashlamp, or one or more linear flashlamps are placed alongside the Dewar flask outside the liquid nitrogen. Such laser systems are operable; however, there are several disadvantages in such a system. For example, the dimensional constraints of the Dewar limit the size of the laser elements that may be used, and maximum pump-laser coupling efficiency cannot be obtained through the Dewar container. Pump-laser coupling efficiency can be improved by immersion of the flashtube in the liquid nitrogen. However, when prior art flashlamps such as xenon are immersed in a coolant at a temperature below 180° C. in liquid nitrogen, the xenon gas they contain freezes or the partial pressure becomes so low that the flashlamps become inoperable. Thus, the flashlamps in prior art systems must be placed outside the Dewar flask.

The disadvantages of the prior art flashlamp-laser systems are overcome by the present invention wherein a flashlamp is provided which can be immersed within the coolant and thereafter operated as desired in a laser system.

It is therefore an object of the present invention to provide a flashlamp-laser system in which the flashlamp is operable at temperature of −180° C. and lower.

Another object is to provide an improved flashlamp which is operable at temperatures of −180° C. and lower for any desired purpose.

Still another object is to provide flashlamps, operable at temperatures of −180° C. and lower which use the designs, structures and components of prior art flashlamps with only small additional cost.

Other objects, advantages and features of the present invention should become apparent from the following detailed description which is taken in conjunction with the accompanying drawing, in which.

Figure 1:
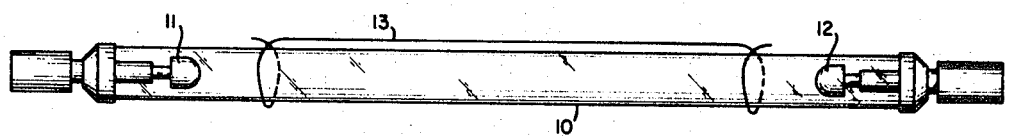
FIG. 1, represents a linear flashlamp made in accordance with the present invention.

The present invention is directed to a gas-type flashlamp which may be operated while immersed in a coolant at a temperature of −180° C. or lower. The flashlamp contains a mixture of xenon, at a partial pressure of 5 to 1,500 Torr, and one of the following gases, namely helium, neon, argon, krypton, hydrogen, or nitrogen, as a starting gas, at a partial pressure of 5 to 400 Torr. The pressures of each gas are specified for a temperature of about 25° C. The starting gas will be characterized at any selected operating temperature by a vapor pressure high enough to allow an electrical arc discharge to be initiated. Since xenon is frozen and has a very low vapor pressure at a temperature of −180° C., flashlamps containing only xenon cannot be operated at that temperature. The addition of a starting gas allows one to start a discharge that will heat and vaporize the frozen xenon, which will then sustain an arc discharge Now, referring to the drawings, wherein like reference characters represent like parts throughout the specification, FIG. 1 represents a specific embodiment of a linear flashlamp 9 made in accordance with the teaching of the present invention. As shown, a short thin cylindrical light-transparent envelope 10 has axially aligned electrodes 11 and 12 positioned at opposite ends. The envelope is filled with a mixture of argon and xenon gas in which the partial pressure of the argon at about 25° C. is less 100 Torr and the partial pressure of the xenon at about 25° C. is 600 Torr. A trigger wire 13 may be placed around the lamp envelope between the end electrodes for the purposes of ionizing the argon to initiate the discharge or means separate from the envelope may be used.

Figure 2:
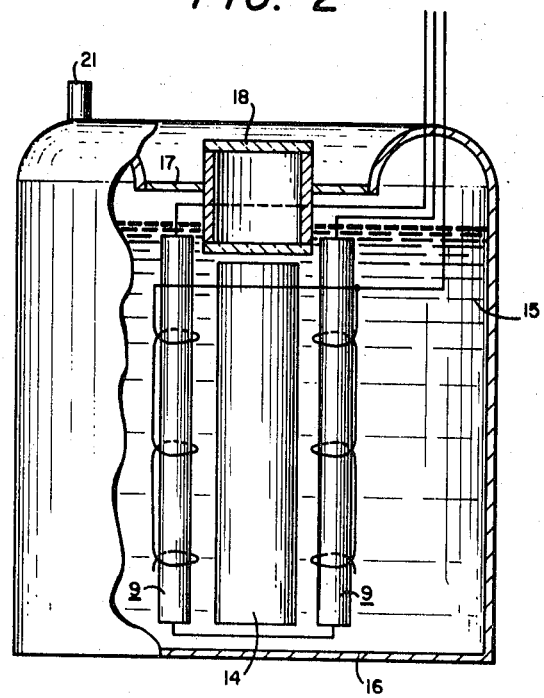
FIG. 2, represents a laser system operable at liquid nitrogen temperature with flashlamps of the present invention.

FIG. 2 is a diagrammatic representation of a laser system in which one or more flashlamps 9 made in accordance with the present invention provide excitation light for a laser element 14. The flashlamps 9 and laser element 14 are immersed in liquid nitrogen 15 or any other coolant contained in a Dewar 16 or any other suitable container. The upper end of the container is provided with a movable cover 17 which includes an optical window 18 in axial alignment with the container. The removable cover permits one to insert into the container of liquid nitrogen flashlamp-laser assemblies having components of various types, sizes and shapes to carry out any desired operation. The window in the removable cover permits light from the laser to exit from the container. If it is desired to have the light emerge from each end of the laser element, a window may also be placed at the bottom of the container in alignment with the laser element. The container may be provided with one or more fill pipes 21 which may used to replenish the liquid nitrogen and through which necessary electrical conductors may be passed and secured to the flashlamp and trigger wires. However, the electrical conductors may be permanently retained by mechanical supports or a seal at the aperture through which they pass.

In operation, an electric potential of typically 3,000 volts is maintained between the ends of the series of flashlamps 9 by a charged capacitance of typically 500 microfarads. A brief pulse of typically volts 20,000 volts applied to the trigger wire initiates ionization of the argon in the flashlamps, causing an electrical discharge to begin, supported by the charged capacitance. That discharge due to ionization of the argon heats and vaporizes frozen xenon in the lamps. As it vaporizes, the xenon becomes ionized by the existing discharge and allows the discharge current rapidly to reach the arc stage, which persists until the charge is removed from the capacitance. Light is generated by the arc discharge just as in prior art lamps at room temperature. However, the lamps 9 of this invention are immersed in the liquid nitrogen alongside the laser element 14 where the greatest proportion of the light output of the flashlamp may be transferred to the laser element. It is clear that optical coupling means, such as cylindrical lenses between the flashlamps and the laser element, may be employed to improve the transfer of light to the laser element. However, the lamp is immersed within the liquid nitrogen within the Dewar.

Thus, it can be seen that the introduction of argon into prior art xenon flashlamps provides suitable flashlamps for operation at low temperature, e.g. in the liquid nitrogen range. The present invention has been described for use in a linear-type flashlamp with argon starting gas. However, the invention may be carried out in helical, annular or otherwise-shaped lamps as well and with other starting gases, such as helium, neon, krypton, hydrogen, and nitrogen; it is not to be limited to linear flashlamps with argon starting gas. Also the teaching extends to the operation of flashlamps at temperatures at which the arc sustaining operating gas freezes or at which the partial pressure of the operating gas, due to the coolant, is too low to initiate an arc.

Obviously many modifications and variations of the present invention are possible in the light of the above explanations. It is therefore to be understood that, within the scope of the appended claims, the invention may be practiced otherwise than as specifically described.

We claim:

1. A laser system operable at an ambient temperature of approximately −180° C. and lower comprising:
   a container for maintaining coolant from approximately −180° C. and lower,
   a supply of light-transmissive coolant within said container, said coolant having a temperature of −180° C. and lower,
   a laser element,
   at least one flashlamp optically coupled to said laser element,
   said laser element and said flashlamp each immersed within said coolant and operable therein.

2. A laser system as claimed in claim 1 wherein:
   said system includes more than one flashlamp optically coupled to said laser element and operable, in said coolant.

3. A laser system as claimed in claim 1 wherein:
   said coolant has a temperature of liquid nitrogen.

4. A laser system as claimed in claim 3 wherein:
   said flashlamp contains an admixture of xenon and argon respective at a partial pressure approximately 600 and 100 Torr at a temperature of approximately 25° C. which is operable immersed in a coolant having a temperature approximately that of liquid nitrogen.